(12) United States Patent
Matsui

(10) Patent No.: US 8,079,016 B2
(45) Date of Patent: Dec. 13, 2011

(54) INFORMATION PROCESSING APPARATUS AND APPLICATION MANAGEMENT METHOD

(75) Inventor: Yuma Matsui, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1056 days.

(21) Appl. No.: 11/943,010

(22) Filed: Nov. 20, 2007

(65) Prior Publication Data

US 2008/0127080 A1 May 29, 2008

(30) Foreign Application Priority Data

Nov. 24, 2006 (JP) .................................. 2006-317473

(51) Int. Cl.
 *G06F 9/44* (2006.01)
 *G06F 9/46* (2006.01)
 *G06F 11/00* (2006.01)
(52) U.S. Cl. ..................... 717/120; 714/38.13; 718/102
(58) Field of Classification Search .................. 717/120; 718/102; 714/38.13
See application file for complete search history.

(56) References Cited

U.S. PATENT DOCUMENTS

| | | | | |
|---|---|---|---|---|
| 6,044,394 A * | 3/2000 | Cadden et al. | ................ | 718/107 |
| 6,711,739 B1 * | 3/2004 | Kutcher | ............................. | 718/1 |
| 6,910,209 B2 * | 6/2005 | Kawahara et al. | ............ | 718/102 |
| 7,818,421 B2 * | 10/2010 | Machida | ....................... | 709/224 |
| 7,975,268 B2 * | 7/2011 | Kaneko | .......................... | 718/100 |
| 2004/0133891 A1 * | 7/2004 | Dahlstedt et al. | ............. | 718/100 |
| 2004/0139432 A1 * | 7/2004 | Bender et al. | ................. | 718/100 |
| 2005/0091640 A1 * | 4/2005 | McCollum et al. | ............ | 717/117 |
| 2008/0010536 A1 * | 1/2008 | Bates et al. | ..................... | 714/38 |
| 2010/0005481 A1 * | 1/2010 | Lewis et al. | .................... | 719/320 |

FOREIGN PATENT DOCUMENTS

| | | |
|---|---|---|
| JP | 02-159619 A | 6/1990 |
| JP | 2004-252633 | 9/2004 |
| JP | 2005-141699 A | 6/2005 |
| JP | 2005-339070 | 12/2005 |

OTHER PUBLICATIONS

Bott et al., "Windows XP Inside Out"; Microsoft Press, 2002, pp. 241-244.*

* cited by examiner

*Primary Examiner* — Li Zhen
*Assistant Examiner* — Ryan Coyer

(57) ABSTRACT

An information processing apparatus includes an application management framework for managing the operating state of an application; another framework different from the application management framework; and an application that operates using this other framework. The application management framework has a determination unit adapted to determine whether or not the application is capable of being halted; and a halt control unit adapted to halt the application if the determination unit determines that the application is capable of being halted, and cancel the halting of the application if the determination unit determines that the application is not capable of being halted.

9 Claims, 9 Drawing Sheets

```
/*APPLICATION MANAGEMENT FRAMEWORK*/
stop() {
    ...
    if application.hasStopCondition()
        if application.canStop()
            doStop()
        else
            ...
    else
        doStop()
    ...
}
```

502

```
/*APPLICATION UTILIZED IN FRAMEWORK*/
canStop() {
    ...
    if otherFramework.canReleaseApp()
        ...
        return TRUE
    else
        ...
        return FALSE
}
```

INFORMATION PROCESSING APPARATUS AND APPLICATION MANAGEMENT METHOD

BACKGROUND OF THE INVENTION

1. Field of the Invention

The present invention relates to an information processing apparatus and application management method.

2. Description of the Related Art

When software is installed, uninstalled or updated to a later version, the existence of required resources is checked as a software precondition (for example, see the specification of Japanese Patent Laid-Open No. 2004-252633). Further, when middleware is installed, the necessary resident process is halted and installation carried out (for example, see the specification of Japanese Patent Laid-Open No. 2005-339070).

However, in a case where an application is run in an application management framework and the application utilizes another framework, it is necessary to consider the compatibility between the two frameworks. For example, assume that in a case where the application is running utilizing the other framework, the application management framework halts the application. If this happens, the application is brought to the halted state regardless of the success or failure of processing executed by the other framework for the purpose of releasing the application. This can lead to system-related problems.

SUMMARY OF THE INVENTION

Accordingly, the present invention seeks to halt an application in such a manner that a mismatch will not arise between frameworks.

In accordance with one aspect of the present invention, there is provided an information processing apparatus, comprising: an application management framework for managing the operating state of an application; another framework different from the application management framework; and the application that operates using the other framework, wherein the application management framework has: a determination unit adapted to determine whether or not the application is capable of being halted; and a halt control unit adapted to halt the application if the determination unit determines that the application is capable of being halted, and cancel the halting of the application if the determination unit determines that the application is not capable of being halted.

In accordance with another aspect of the present invention, there is provided an information processing apparatus, comprising: an application management framework for managing the operating state of an application; another framework different from the application management framework; and the application that operates using the other framework, wherein the application has a halt-condition discrimination unit adapted to, responsive to a call from the application management framework for querying the other framework, which is being used by the application, as to whether or not the application is capable of being released from the other framework, discriminate that the application is capable of being halted if a query result indicating that release from the other framework is possible is received from the other framework, and discriminate that the application is incapable of being halted if a query result indicating that release from the other framework is not possible is received from the other framework.

In accordance with still another aspect of the present invention, there is provided an information processing apparatus, comprising: an application management framework for managing the operating state of an application; another framework different from the application management framework; the application that operates using the other framework; and an application management service that utilizes functions of the application management framework, wherein the application management service includes: a halt instruction unit adapted to instruct the application management framework to halt the application; and a display control unit adapted to display the fact that halting of the application will be cancelled, upon receiving information from the application management framework indicating that halting of the application will be cancelled.

In accordance with yet another aspect of the present invention, there is provided an application management method in an information processing apparatus having an application management framework for managing the operating state of an application, another framework different from the application management framework, and the application that operates using the other framework, the method comprising: determining, at the application management framework, whether or not the application is capable of being halted; and halting the application if it is determined in the determining step that the application is capable of being halted, and canceling the halting of the application if it is determined in the determining step that the application is not capable of being halted.

In accordance with still yet another aspect of the present invention, there is provided an application management method in an information processing apparatus having an application management framework for managing the operating state of an application, another framework different from the application management framework, and the application that operates using the other framework, the method comprising, at the application, in response to a call from the application management framework, querying the other framework, which is being used by the application, as to whether or not the application is capable of being released from the other framework, discriminating that the application is capable of being halted if a query result indicating that release from the other framework is possible is received from the other framework, and discriminating that the application is incapable of being halted if a query result indicating that release from the other framework is not possible is received from the other framework.

In accordance with yet still another aspect of the present invention, there is provided an application management method in an information processing apparatus having an application management framework for managing the operating state of an application, another framework different from the application management framework, the application that operates using the other framework, and an application management service that utilizes functions of the application management framework, the method comprising: instructing, at the application management service, the application management framework to halt the application; and displaying, at the application management service, the fact that halting of the application will be cancelled, upon receiving information from the application management framework indicating that halting of the application will be cancelled.

Further features of the present invention will become apparent from the following description of exemplary embodiments with reference to the attached drawings.

BRIEF DESCRIPTION OF THE DRAWINGS

FIG. 6 is a diagram illustrating the processing of FIG. 5 in the form of pseudocode;

DESCRIPTION OF THE EMBODIMENTS

Embodiments of the present invention will now be described with reference to the drawings.

An application management system to which the present invention is applicable is executable by any apparatus whatsoever if the execution environment thereof has been mounted. An information processing apparatus will be described below as an example of the apparatus. Several other frameworks may coexist with an application management framework.

First Embodiment

Figure 1:
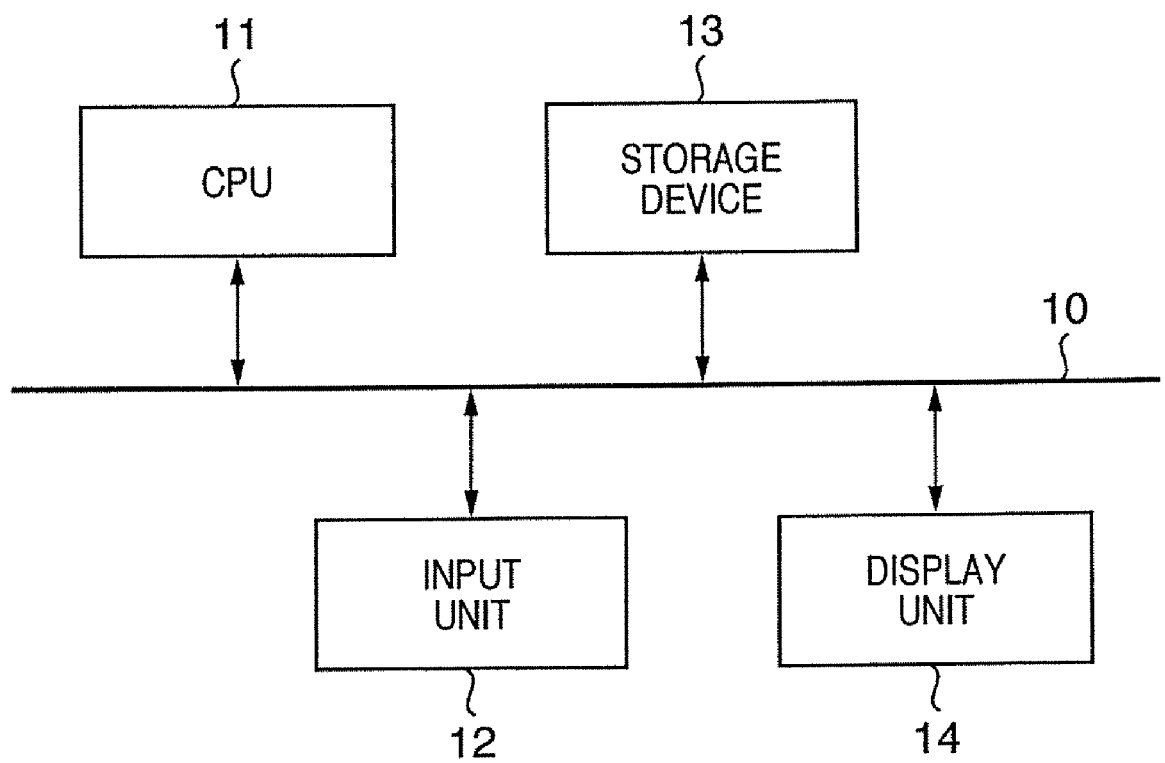
FIG. 1 is a diagram illustrating an example of the hardware implementation of an information processing apparatus.

FIG. 1 is a diagram illustrating an example of the hardware implementation of an information processing apparatus. As illustrated in FIG. 1, the information processing apparatus has a CPU 11 that controls the overall information processing apparatus. By executing programs, which have been stored in a storage device 13, corresponding to a service, applications, frameworks and program execution environment described later, the CPU 11 implements processing representing various functions or flowcharts, described later.

An input unit 12, the storage device 13 and a display unit 14 are connected to the CPU 11 via a bus 10. The storage device 13 comprises a ROM, RAM and hard disk, etc. In addition to the programs mentioned above, the storage device 13 also stores data used in processing based upon these programs. The display unit 14 is a display for displaying screens, etc., described later.

Figure 2:
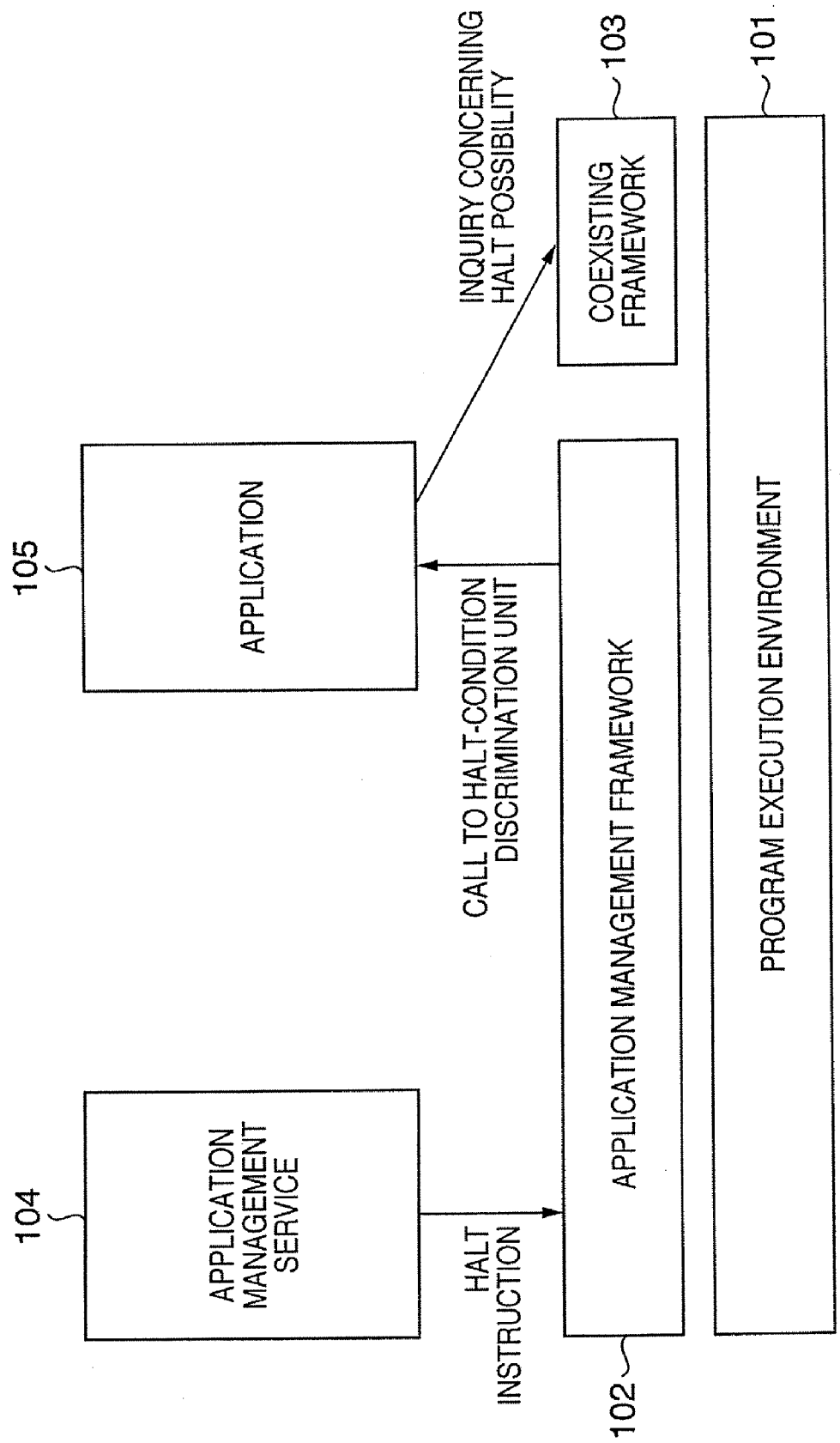
FIG. 2 is a diagram illustrating an example of the functional configuration of an application management system.

The functional configuration of the application management system of the information processing apparatus will be described next. FIG. 2 is a diagram illustrating an example of the functional configuration of the application management system. It should be noted that the blocks 101, 102, 103, 104 and 105 mentioned below are realized whereby the CPU 11 executes programs in the storage device 13.

A program execution environment 101 is an execution environment that is necessary in order to operate the application management system. An application management framework 102 is a framework for managing the operating states of applications. A coexisting framework 103 is another framework that operates in coexistence with the application management framework 102. It should be noted that the coexisting framework 103 may also be referred to simply as "the other framework 103".

This framework is software situated intermediate each application and the program execution environment 101 and provides each application with a function that is more versatile than that of the application.

The application management service 104 operates in the application management framework 102 and provides a function serving as the front end of the application management framework 102. Application 105 operates in the application management framework 102 and runs while utilizing the other framework at the same time.

If the application 105 is halted from the application management service 104, processing for halting the application of interest (application 104) is executed through the application management framework 102. When the application management framework 102 halts the application of interest, a halt-condition check function (a halt-condition discrimination unit 41, described later) checks the halt condition if this unit exists in the application of interest.

In the check of the halt condition, the halt-condition discrimination unit 41 queries the other framework 103 as to whether the application of interest is capable of being released from the other framework 103. The application management framework 102 that has received the result of the inquiry from the application 105 determines, in accordance with the result of the inquiry, whether to actually halt the application 105 or cancel (abort) halt processing.

Figure 3:
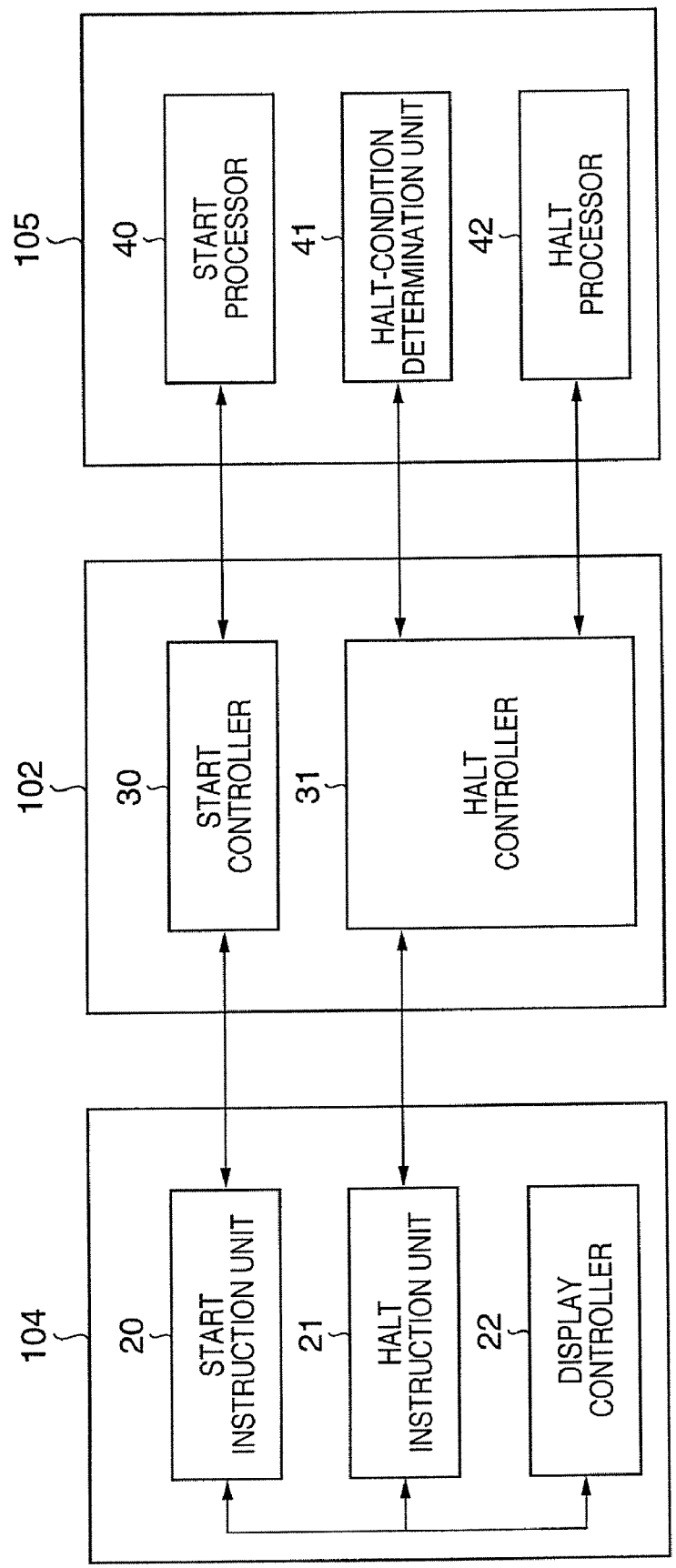
FIG. 3 is a diagram illustrating the functional structures of an application management service, application management framework and application.

FIG. 3 is a diagram illustrating the functional structures of the application management service 104, application management framework 102 and application 105.

As illustrated in FIG. 3, the application management service 104 includes a start instruction unit 20, halt instruction unit 21 and display controller 22 as functional structure. The application management framework 102 includes a start controller 30 and halt controller 31 as functional structure. The application 104 includes a start processor 40, a halt-condition discrimination unit 41 and a halt processor 42. By changing the start processor 40, the halt-condition discrimination unit 41 or the halt processor 42 on a per-application basis, application-specific processing can be executed.

The start instruction unit 20 calls the start controller 30 of the application management framework 102 upon receiving an application-start request from the user via a screen, which is displayed on the display unit 14, and/or the input unit 12. Upon being called from the start instruction unit 20, the start controller 30 calls the start processor 40 of the application 105. When it receives the result of start processing from the start processor 40, the start controller 30 sends the result of start processing back to the start instruction unit 20. Upon receiving the result of start processing from the start instruction unit 20, the display controller 22 displays the result of start processing on the screen, etc., by way of example. On the other hand, when the start processor 40 is called from the start controller 30, the start processor 40 executes application start processing and sends the result of start processing back to the start controller 30.

Upon accepting an application-halt request from the user via a screen, which is displayed on the display unit 14, and/or the input unit 12, the halt instruction unit 21 calls the halt controller 31 of the application management framework 102. Upon being called from the halt instruction unit 21, the halt controller 31 calls the halt-condition discrimination unit 41 of the application 105.

In a case where the application 105 does not have the halt-condition discrimination unit 41 and the halt controller 31 cannot call the halt-condition discrimination unit 41 of the application 105, the halt controller 31 determines that the application 105 is capable of being halted.

On the other hand, in a case where the application 105 has the halt-condition discrimination unit 41 and the halt controller 31 can call the halt-condition discrimination unit 41 of the application 105, the result of determination as to whether or not halting is possible is accepted from the halt-condition discrimination unit 41. On the basis of the result of determination, the halt controller 31 determines whether or not the application 105 is capable of being halted. In other words, if a determination result indicating that halting is possible is received from the halt-condition discrimination unit 41, then the halt controller 31 determines that the application 105 is capable of being halted. Further, if a determination result indicating that halting is not possible is received, then the halt controller 31 determines that the application 105 is incapable of being halted.

If it is determined that the application 105 is capable of being halted, the halt controller 31 calls the halt processor 42 of the application 105 and, upon receiving the result of halt processing from the halt processor 42, sends the result of halt processing back to the halt instruction unit 21. Upon receiving the result of halt processing from the halt instruction unit 21, the display controller 22 displays the result of halt processing on the screen, etc., by way of example. On the other hand, upon being called from the halt controller 31, the halt processor 42 executes application halt processing and sends the result of halt processing back to the halt controller 31.

On the other hand, if it is determined that the application 105 is incapable of being halted, the halt controller 31 does not call the halt processor 42 and sends the halt instruction unit 21 information indicating that halting is not possible. Upon receiving this information from the halt instruction unit 21, the display controller 22 causes the display screen to display information to the effect that the application 105 cannot be halted, by way of example.

Figure 4:
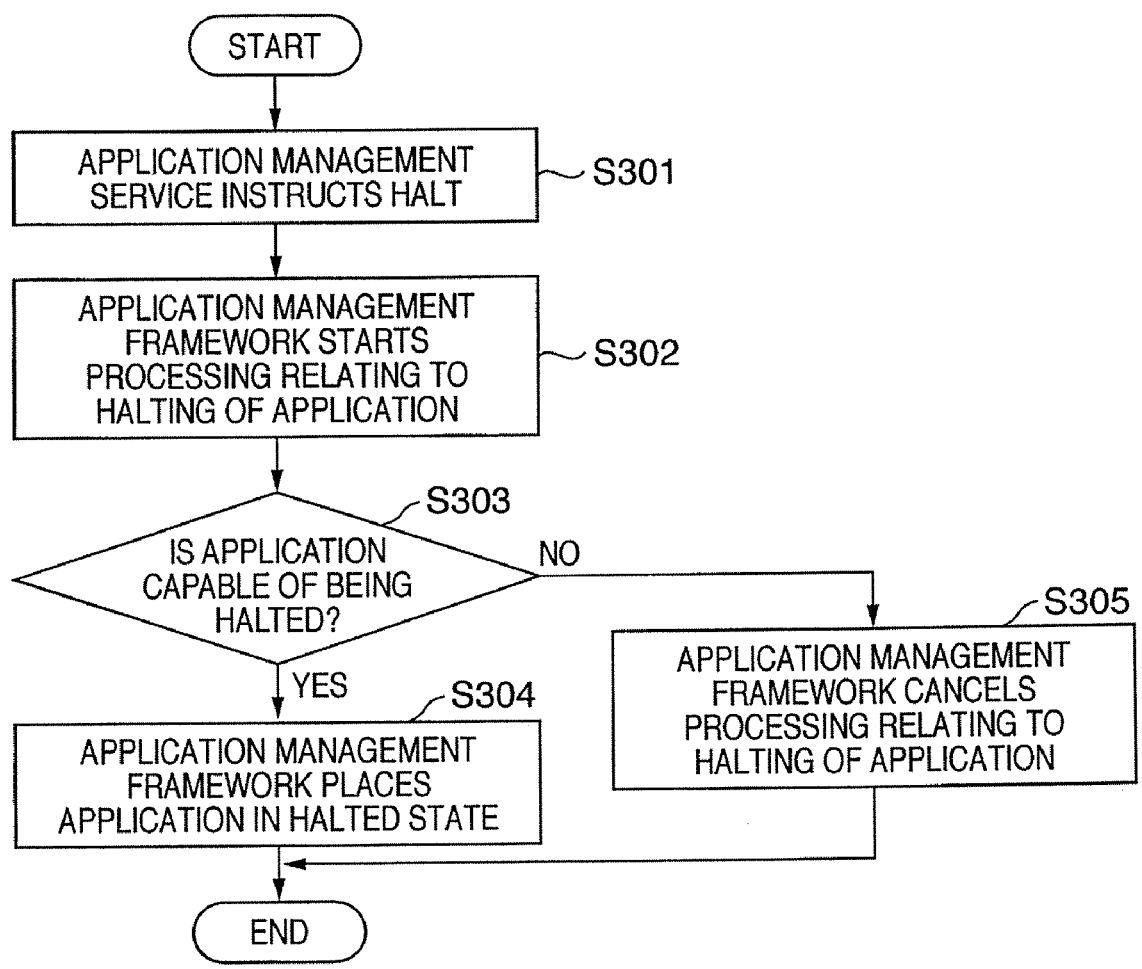
FIG. 4 is a flowchart illustrating an example of application halt processing.

FIG. 4 is a flowchart illustrating an example of application halt processing.

At step S301, the halt instruction unit 21 of the application management service 104 instructs the halt controller 31 of the application management framework 102 to halt the application 105.

Next, at step S302, the halt controller 31 of the application management framework 102 receives the instruction from the halt instruction unit 21 of the application management service 104 and starts processing relating to halting of the application 105.

Next, at step S303, the halt controller 31 of the application management framework 102 determines whether the application 105 is capable of being halted. The details of the processing of step S303 are hereinafter described with reference to FIG. 5. If the halt controller 31 determines that the application 105 is capable of being halted ("YES" at step S303), control proceeds to step S304. If the halt controller 31 determines that the application 105 is incapable of being halted ("NO" at step S303), then control proceeds to step S305.

At step S304, the halt controller 31 of the application management framework 102 calls the halt processor 42 of the application 105. The halt processor 42 of the application 105 executes processing to halt the application 105, and the application 105 is placed in the halted state.

At step S305, on the other hand, the halt controller 31 of the application management framework 102 cancels the processing relating to halting of the application 105 and, as described above, sends the halt instruction unit 21 information indicating that halting is not possible, by way of example.

Figure 5:
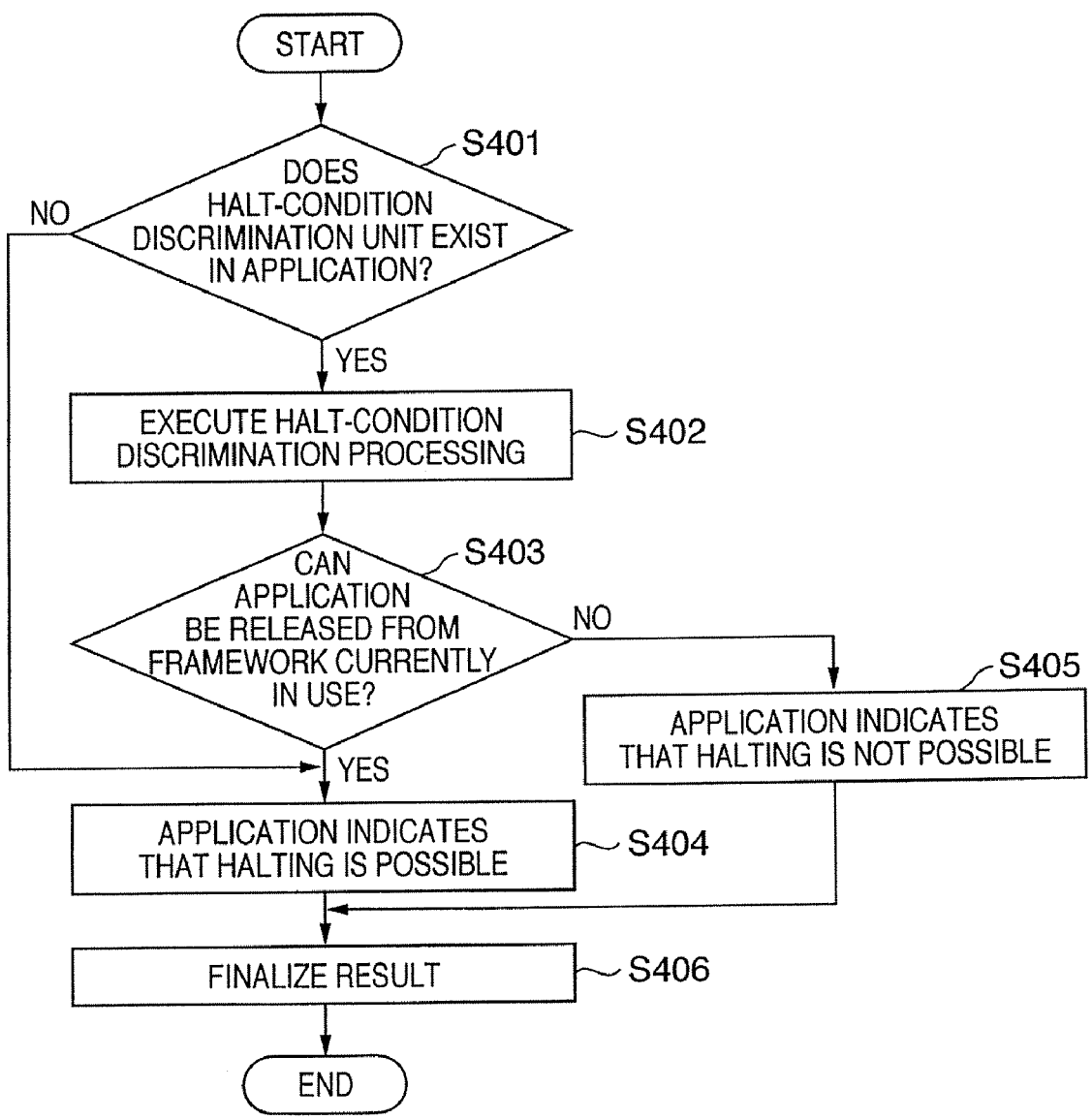
FIG. 5 is a flowchart illustrating an example of the detail procedure of processing for determining whether or not an application is capable of being halted.

FIG. 5 is a flowchart illustrating an example of the details of processing for determining whether or not an application is capable of being halted.

At step S401, the halt controller 31 of the application management framework 102 determines whether the halt-condition discrimination unit 41 exists in the application of interest (the application 105 in this embodiment). If the halt controller 31 determines that the halt-condition discrimination unit 41 does not exist ("NO" at step S401), control proceeds to step S404 and it is construed that the application 105 is capable of being halted. On the other hand, if the halt controller 31 determines that the halt-condition discrimination unit 41 exists ("YES" at step S401), then control proceeds to step S402.

At step S402, the halt controller 31 of the application management framework 102 calls the halt-condition discrimination unit 41 of the application 105. The halt-condition discrimination unit 41 then executes processing for discriminating halt conditions.

At step S403, the halt-condition discrimination unit 41 queries a framework (the other framework 103 in this embodiment) other than the application management framework 102 being utilized by the application 105 as to whether the application is capable of being released. If the result of the inquiry is that release is possible, then the halt-condition discrimination unit 41 discriminates that release from the framework currently in use is possible ("YES" at step S403) and control proceeds to step S404. On the other hand, if the result of the inquiry is that release is not possible, then the halt-condition discrimination unit 41 discriminates that release from the framework currently in use is not possible ("NO" at step S403) and control proceeds to step S405.

At step S404, the halt-condition discrimination unit 41 of application 105 sends the discrimination result indicating that halting is possible to the halt controller 31 of application management framework 102. Upon receiving the result of the determination, the halt controller 31 construes that the application 105 is capable of being halted.

At step S405, however, the halt-condition discrimination unit 41 of application 105 sends the discrimination result indicating that halting is not possible to the halt controller 31 of application management framework 102. Upon receiving the result of the discrimination, the halt controller 31 construes that the application 105 is incapable of being halted.

At step S406, the halt controller 31 finalizes the determination as to whether the application can be halted or not.

FIG. 6 is a diagram illustrating the processing of FIG. 5 in the form of pseudocode. Reference numeral 501 denotes an example of the code description of processing on the side of the application management framework 102, and reference numeral 502 denotes an example of the code description of processing on the side of the application 105.

Second Embodiment

The configuration of the application management system and the flow of processing thereof are described in the first embodiment. In a second embodiment, a procedure followed when a GUI application is actually halted in the application management system will be described while referring to examples of operating screens. In this embodiment, a GUI management framework is taken up as an example of another framework that coexists with the application management framework 102. However, the other framework may be of any type whatsoever.

Figure 7:
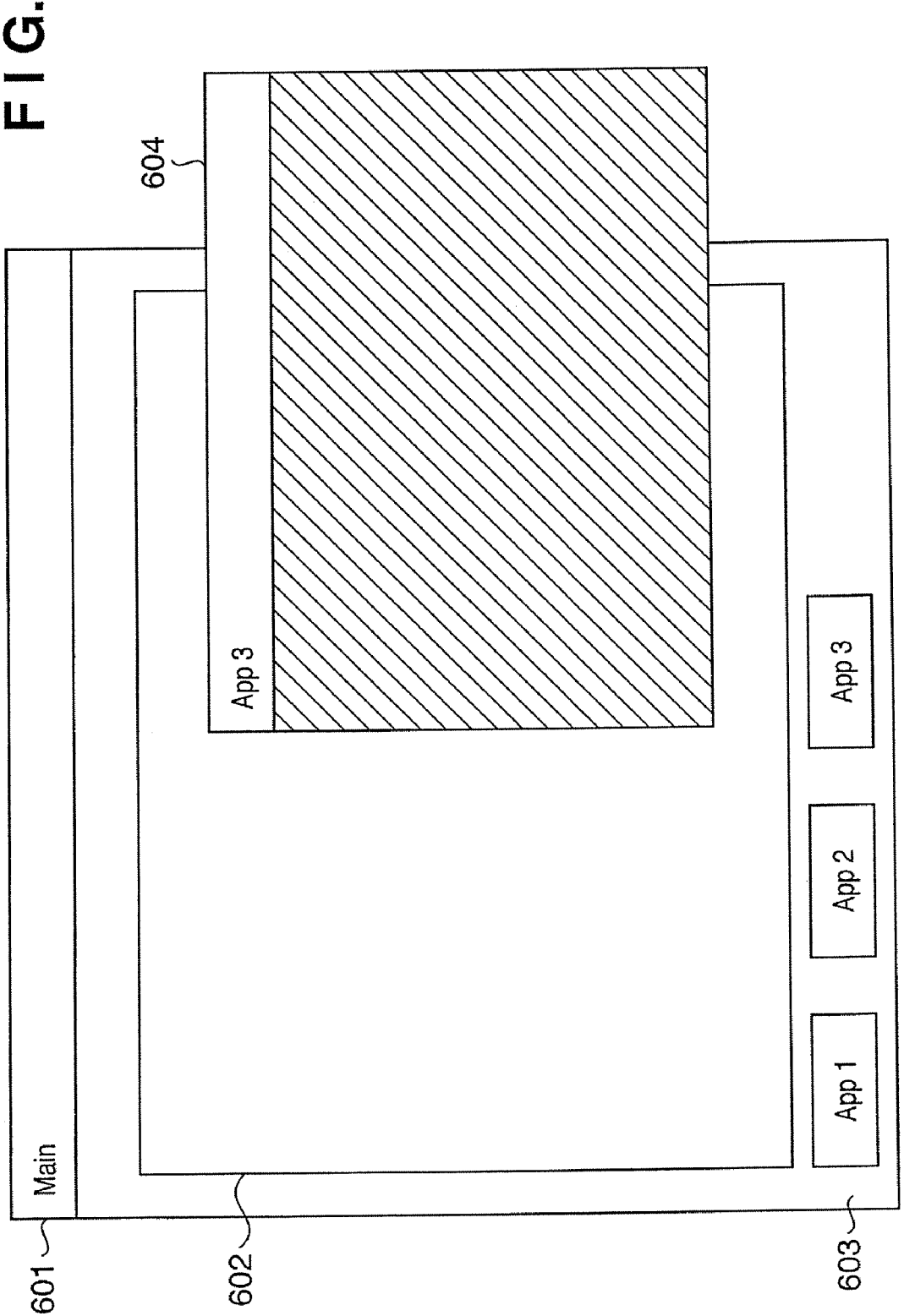
FIG. 7 is a diagram illustrating an example of the operating screen of a GUI application.

FIG. 7 is a diagram illustrating an example of the operating screen of the GUI application. Reference numeral 601 denotes the overall operating screen. Reference numeral 602 denotes a screen display area of applications in the application management system. Reference numeral 603 denotes an area for displaying application buttons. The buttons of applications in the operating state are displayed in the application management system. By pressing each application button, the user can change over the application that is being displayed in the application screen display area to the screen of the application corresponding to the button pressed.

Reference numeral 604 denotes a window in which the application "App3" from among the applications in the operating state is displayed in pop-up form. At this time the application causes the window to be displayed utilizing the GUI management framework.

Figure 8:
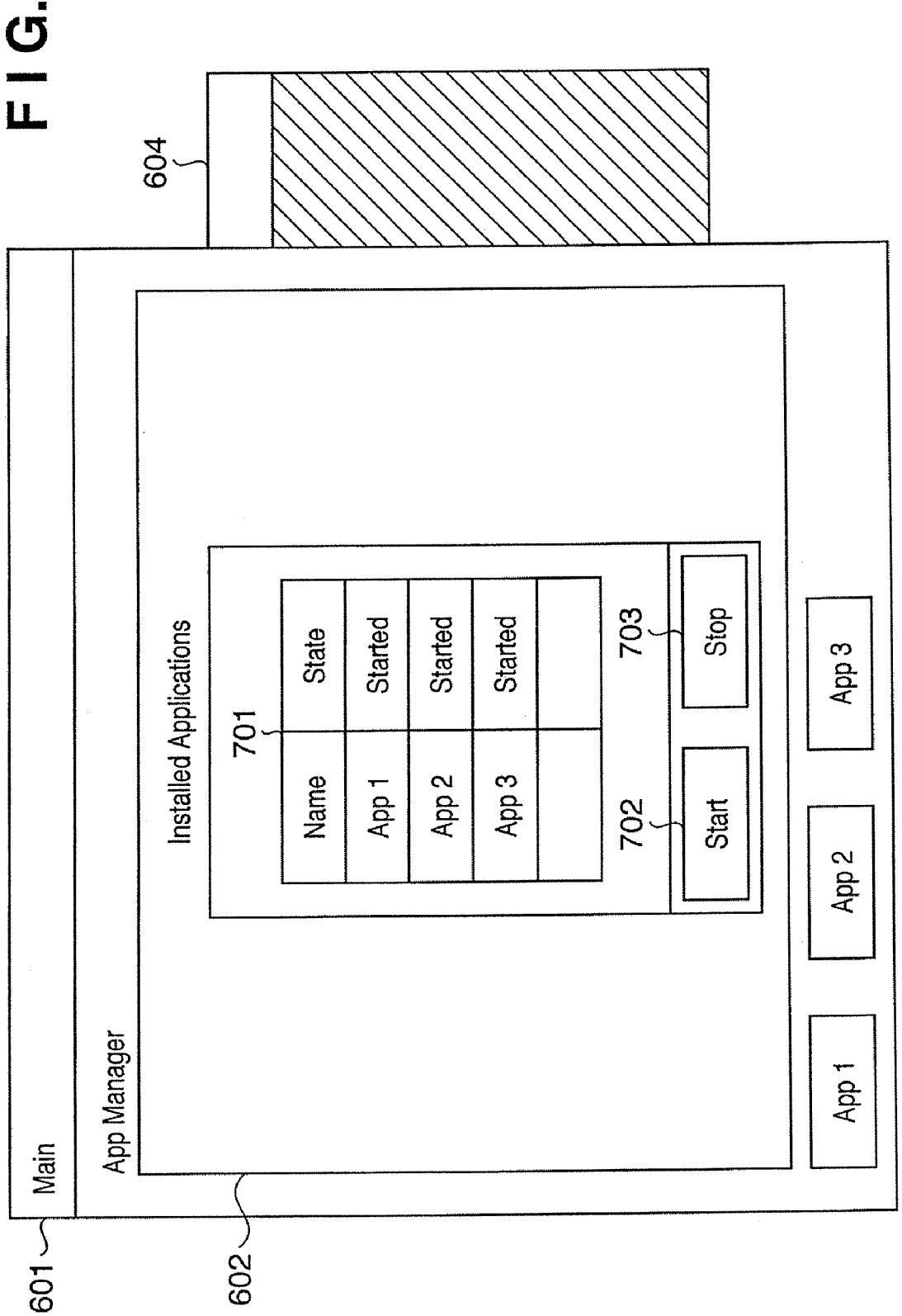
FIG. 8 is a diagram illustrating an example of the operating screen of an application management service.

FIG. 8 is a diagram illustrating an example of the operating screen of an application management service. A screen of the application management service 104 is being displayed in the application screen display area 602. Reference numeral 701 denotes a list of installed applications. The name (Name) of each application and the operating state (State) thereof, namely whether it has been started or stopped, are displayed in the list, by way of example. The user can select from the application list an application that the user desired to be the object of an operation.

Reference numeral 702 denotes a button for executing processing to start the selected application. Reference numeral 703 denotes a button for executing processing to halt the selected application. Consider a case where the user selects "App3" from the screen and halts the application. It should be noted that since "App3" is in the state in which it is displayed in the pop-up window using the GUI management framework, "App3" cannot be released from the GUI management framework at this time. Accordingly, when the determination regarding the halt conditions of "App3" is made in the halt-condition discrimination unit 41, halting of the application of interest becomes impossible and halt processing is cancelled in the halt controller 31.

Figure 9:
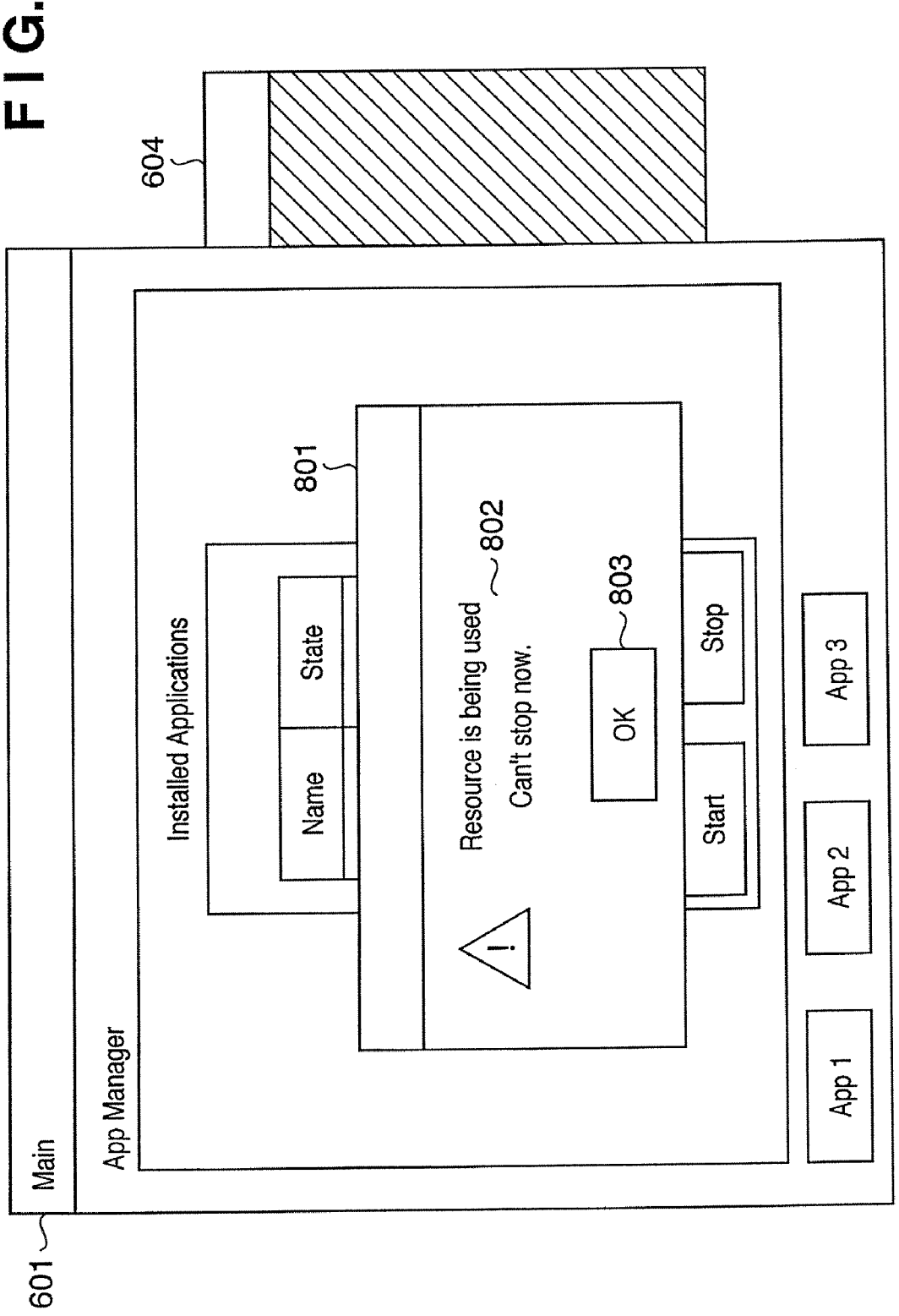
FIG. 9 is a diagram illustrating an example of a dialog window reporting that halt processing has been cancelled.

FIG. 9 is a diagram illustrating an example of an operating screen for displaying a dialog window which, when halt processing has been cancelled, allows the application management service to so report. Reference numeral 801 denotes a dialog window for displaying the fact that processing for halting the application of interest has been cancelled. Reference numeral 802 denotes a message that appears in the dialog window.

When the dialog window 801 is displayed, the user presses an OK button to close the dialog window 801 and place "App3" in a state in which it can be released from the GUI management framework, and then executes halt processing again (i.e., presses the button 702). When this is done, the application management system is capable of actually placing the application of interest in the halted state.

By virtue of the fact that the application management system executes the processing described above, an application can be halted while compatibility between the application management framework and another framework is maintained.

In accordance with the present invention, an application can be halted in such a manner that a mismatch will not arise between frameworks.

Other Embodiments

The object of the present invention is attained also by supplying a storage medium (recording medium) storing the software (program) for performing the functions of the foregoing embodiments to a system or an apparatus and executing the software by the computer (CPU or MPU) of the system or apparatus. In this case, the software per se read out of the storage medium implements the functions of the embodiments and the storage medium storing the software constitutes the invention.

Furthermore, besides the case where the aforesaid functions are implemented by executing the software, the present invention also covers a case where an operating system or the like running on the computer executes a part of or the entire actual process in accordance with the designations in the software and implements the functions thereby.

Further, the present invention also covers a case where the software is written to a memory of a function expansion card or unit connected to a computer, a CPU or the like of the card or unit executes a part of or the entire actual process in accordance with the designations in the software and implements the functions thereby.

In a case where the present invention is applied to the storage medium, software corresponding to the flowcharts described earlier is stored in the storage medium.

In accordance with each of the embodiments described above, an application can be halted in such a manner that a mismatch will not arise between frameworks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-317473, filed Nov. 24, 2006, which is hereby incorporated by reference herein in its entirety.

What is claimed is:
1. An information processing apparatus, comprising:
an application management framework for managing an operating state of an application;
other frameworks different from the application management framework;
the application, wherein the application operates using the other frameworks, wherein the application management framework has:
a determination unit adapted to query the other frameworks used by the application as to whether the application can be released, determine that the application can be halted, if a query result indicating that release from the other frameworks is possible is received from all of the other frameworks, and determine that the application cannot be halted if a query result indicating that release from the other frameworks is impossible is received from one of the other frameworks, wherein the determination unit determines whether a halt-condition discrimination unit adapted to discriminate halt conditions exists in the application, causes the halt-condition discrimination unit to operate if the determination unit determines that the halt-condition discrimination unit exists in the application, and determines whether the application is capable of being halted in accordance with a result of discrimination in the halt-condition discrimination unit; and
a halt control unit adapted to halt the application if the determination unit determines that the application can be halted, and cancel the halting of the application if the determination unit determines that the application is not cannot be halted; and
a central processing unit configured to control at least one of being halted the application management framework and the other frameworks different from the application management framework.

2. The information processing apparatus according to claim 1, wherein the determination unit determines whether a halt-condition discrimination unit adapted to discriminate halt conditions exists in the application and determines that the application is capable of being halted if the determination unit determines that the halt-condition discrimination unit does not exist.

3. The information processing apparatus according to claim 1, further comprising:
an application management service that utilizes functions of the application management framework,
wherein the application management service has a halt instruction unit adapted to instruct the application management framework to halt the application, and
the determination unit determines whether the application is capable of being halted upon receiving the application halt instruction from the application management service.

4. The information processing apparatus according to claim 3, wherein the application management service further includes a display control unit adapted to display a fact that halting of the application will be cancelled, upon receiving information from the application management framework indicating that halting of the application will be cancelled.

5. An information processing apparatus, comprising:
an application management framework for managing an operating state of an application;
other frameworks different from the application management framework; and
the application, wherein the application operates using the other frameworks,
wherein the application has:
a halt-condition discrimination unit adapted to, responsive to a call from the application management framework, query the other frameworks used by the application as to whether the application can be released, discriminate that the application can be halted if a query result indicating that release from the other frameworks is possible is received from all of the other frameworks, and discriminate that the application cannot be halted if a query result indicating that release from the other frameworks is impossible is received from one of the other frameworks; and
wherein the application management framework has:
a determination unit adapted to query the other frameworks used by the application as to whether the application can be released, determine that the application can be halted, if a query result indicating that release from the other frameworks is possible is received from all of the other frameworks, and determine that the application cannot be halted if a query result indicating that release from the other frameworks is impossible is received from one of the other frameworks, wherein the determination unit causes the halt-condition discrimination unit to operate if the determination unit determines that the halt-condition discrimination unit exists in the application, and determines whether the application is capable of being halted in accordance with a result of discrimination in the halt-condition discrimination unit; and
a central processing unit configured to control at least one of the application management framework and the other frameworks different from the application management framework.

6. An information processing apparatus, comprising:
an application management framework for managing an operating state of an application;
other frameworks different from the application management framework;
the application, wherein the application operates using the other frameworks;
an application management service that utilizes functions of the application management framework, wherein the application management service includes:
a halt instruction unit adapted to instruct the application management framework to halt the application; and
a display control unit adapted to display the fact that halting of the application will be cancelled, upon receiving information from the application management framework indicating that halting of the application will be cancelled,
wherein the application management framework has:
a determination unit adapted to query the other frameworks used by the application as to whether the application can be released, determine that the application can be halted, if a query result indicating that release from the other frameworks is possible is received from all of the other frameworks, and determine that the application cannot be halted if a query result indicating that release from the other frameworks is impossible is received from one of the other frameworks, wherein the determination unit determines whether a halt-condition discrimination unit adapted to discriminate halt conditions exists in the application, causes the halt-condition discrimination unit to operate if the determination unit determines that the halt-condition discrimination unit exists in the application, and determines whether the application is capable of being halted in accordance with a result of discrimination in the halt-condition discrimination unit;
wherein the application management framework queries the other frameworks used by the application as to whether the application can be released, transmits can information if a query result indicating that release from the other frameworks is possible is received from all of the other frameworks, and transmits cannot information if a query result indicating that release from the other frameworks is impossible is received from one of the other frameworks; and
a central processing unit configured to control at least one of the application management framework and the other frameworks different from the application management framework.

7. An application management method in an information processing apparatus having an application management framework for managing an operating state of an application, another framework different from the application management framework, and the application, wherein the application operates using the other framework, the application management method comprising:
querying, using a determination unit, the other frameworks used by the application as to whether the application can be released, determining that the application can be halted if a query result indicating that release from the other frameworks is possible is received from all of the other frameworks, and determining that the application cannot be halted if a query result indicating that release from the other frameworks is impossible is received from one of the other frameworks, wherein the determination unit determines whether a halt-condition discrimination unit adapted to discriminate halt conditions exists in the application, causes the halt-condition discrimination unit to operate if the determination unit determines that the halt-condition discrimination unit exists in the application, and determines whether the application is capable of being halted in accordance with a result of discrimination in the halt-condition discrimination unit; and halting the application if it is determined that the application can be halted, and canceling the halting of the application if it is determined that the application cannot be halted.

8. An application management method in an information processing apparatus having an application management framework for managing an operating state of an application, another framework different from the application management framework, and the application, wherein the application operates using the other framework, the application management method comprising:

querying, at the application and in response to a call from the application management framework, the other frameworks used by the application as to whether the application can be released from the other framework, discriminating that the application can be halted if a query result indicating that release from the other frameworks is possible is received from all of the other frameworks, and discriminating that the application cannot be halted if a query result indicating that release from the other framework frameworks is impossible is received from one of the other frameworks, wherein the querying employs a determination unit adapted to query the other frameworks used by the application as to whether the application can be released, and wherein the determination unit determines whether a halt-condition discrimination unit adapted to discriminate halt conditions exists in the application, causes the halt-condition discrimination unit to operate if the determination unit determines that the halt-condition discrimination unit exists in the application, and determines whether the application is capable of being halted in accordance with a result of discrimination in the halt-condition discrimination unit.

9. An application management method in an information processing apparatus having an application management framework for managing an operating state of an application, another framework different from the application management framework, the application, wherein the application operates using the other framework, and an application management service that utilizes functions of the application management framework, the application management method comprising:

instructing, at the application management service, the application management framework to halt the application;

displaying, at the application management service, a fact that halting of the application will be cancelled, upon receiving information from the application management framework indicating that halting of the application will be cancelled;

querying, at the application management framework, the other frameworks used by the application as to whether the application can be released, transmitting can information if a query result indicating that release from the other frameworks is possible is received from all of the other frameworks, and transmitting cannot information if a query result indicating that release from the other frameworks is impossible is received from one of the other frameworks, wherein the querying employs a determination unit adapted to query the other frameworks used by the application as to whether the application can be released, and wherein the determination unit determines whether a halt-condition discrimination unit adapted to discriminate halt conditions exists in the application, causes the halt-condition discrimination unit to operate if the determination unit determines that the halt-condition discrimination unit exists in the application, and determines whether the application is capable of being halted in accordance with a result of discrimination in the halt-condition discrimination unit.

* * * * *